United States Patent [19]

Komamura et al.

[11] Patent Number: 4,653,888
[45] Date of Patent: Mar. 31, 1987

[54] INDICATOR FOR INDICATING THE PRESENCE OR ABSENCE OF A PHOTO SENSITIVE MATERIAL IN A FILM HOLDER

[75] Inventors: Toshiyuki Komamura; Kanji Tomidokoro, both of Tokyo, Japan

[73] Assignee: Komamura Photographic Co., Ltd., Osaka, Japan

[21] Appl. No.: 717,658

[22] Filed: Mar. 29, 1985

[51] Int. Cl.$^4$ .................... G03B 17/18; G03B 17/26
[52] U.S. Cl. ................................ 354/276; 354/289.1
[58] Field of Search ................... 354/276, 281, 289.1

[56] References Cited

U.S. PATENT DOCUMENTS

| 461,905 | 10/1891 | Hare et al. | 354/281 X |
| 512,914 | 1/1894 | Spalsbury | 354/281 X |
| 970,494 | 9/1910 | Halle | 354/281 |
| 1,143,462 | 6/1915 | Teige et al. | 354/281 |
| 2,946,271 | 7/1960 | Craig. | |
| 3,091,168 | 5/1963 | Craig. | |
| 4,248,172 | 2/1981 | Kröbel et al. | 354/276 X |

Primary Examiner—Michael L. Gellner
Attorney, Agent, or Firm—Birch, Stewart, Kolasch & Birch

[57] ABSTRACT

An indicator according to the present invention is used to indicate the presence or absence of a photo sensitive material in a film holder. The indicator comprises a pivotal indicator element and a actuating element. The pivotal indicator element has a pivot at its one end and is mounted on the surface of the film holder near its exposing window. The actuating element is adapted to be moved interlockingly with the pivot upon the insertion of the photo sensitive material and is provided facing a photo sensitive material receiving channel.

4 Claims, 4 Drawing Figures

INDICATOR FOR INDICATING THE PRESENCE OR ABSENCE OF A PHOTO SENSITIVE MATERIAL IN A FILM HOLDER

DETAILED DESCRIPTION OF THE INVENTION

1. Field of the Invention

The present invention relates to an indicator for confirming whether a photo sensitive material in the form of a film or plate is inserted into a film holder or not without opening a dark slide.

2. Description of the Prior Art

It is a conventional practice to indicate, on the face and reverse of a dark slide in a film holder, whether a photo sensitive material has been exposed or is unexposed in the film holder. The face and reverse of the dark slide each have a different color portion, and the body of the film holder is also partially colored. When the exposure is completed, the dark slide is inversely inserted to judge whether the colors coincide with each other or not. However, whether the sensitive material is inserted or not in the film holder can not be judged without pulling the dark slide. Therefore, such an examination can be made in a light place. If a sensitive material is not inserted in the film holder, a photographing assuming the sensitive material to be inserted may cause a serious result.

OBJECT OF THE INVENTION

It is therefore an object of the present invention to provide an indicator for indicating whether a photo sensitive material is inserted or not, at a part of a film holder, wherein the indication is automatically effected upon the insertion of the photo sensitive material.

This object is accomplished by an indicator comprising an actuating element adapted to be moved upon the photo sensitive material and a pivotal indicator element on the surface of a film holder, the pivotal indicator element being pivoted coaxially with and interlocking with the actuating element so that the pivotal movement of the pivotal indicator element enables the presence of the photo sensitive material to be recognized.

SUMMARY OF THE INVENTION

An indicator according to the present invention comprises a pivotal indicator element having a pivot at its one end, and an actuating element provided to face a photo sensitive material receiving channel. The pivotal indicator element is mounted on the surface of a film holder near its exposing window. The actuating element is adapted to be pivoted interlockingly with the indicator element upon the insertion of the sensitive material. With this arrangement, the insertion of the sensitive material causes the automatic pivotal movement of the actuating element to indicate the presence or absence of the sensitive material. The insertion of the sensitive material is thus confirmed and hence, photographs can be made without anxiety. Moreover, the indicator can be manufactured with an extremely simple arrangement and at a lower cost.

DESCRIPTION OF THE DRAWINGS

The above and other objects of the present invention will become apparent from the following description of the preferred embodiment thereof in conjunction with the accompanying drawings in which.

DESCRIPTION OF PREFERRED EMBODIMENT

Figure 1:
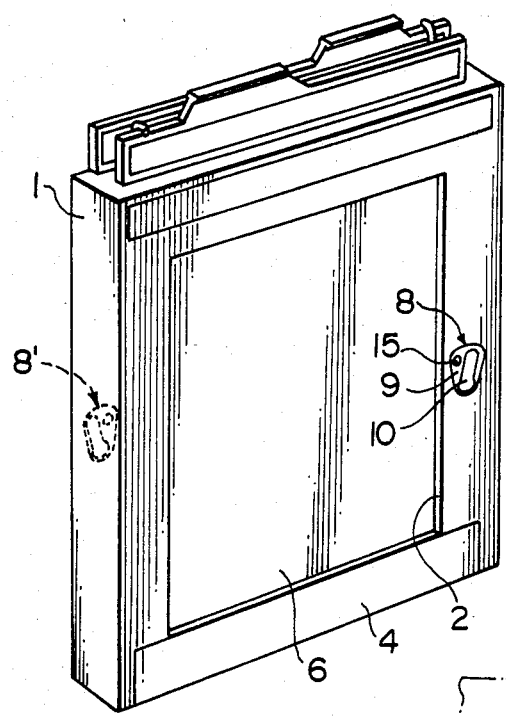
FIG. 1 is a perspective view of a double-sided film holder illustrating an indicator according to the present invention.
Figure 2:
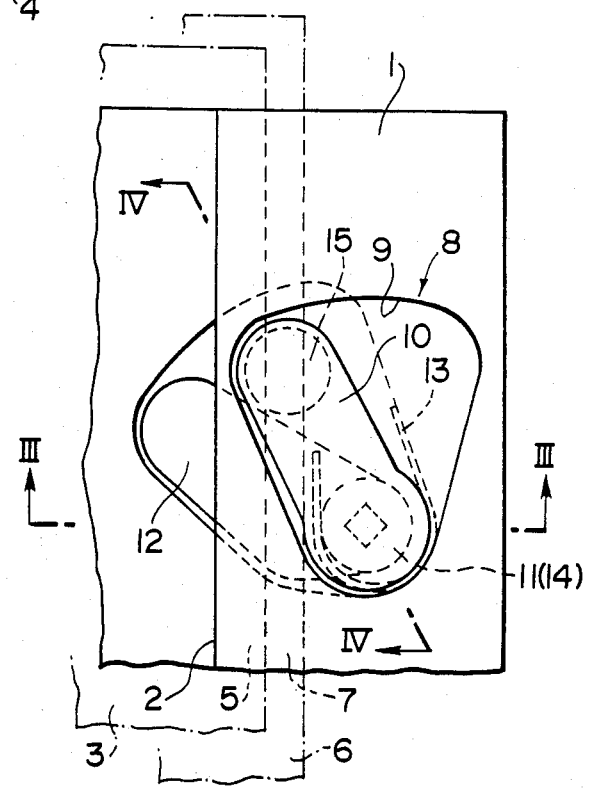
FIG. 2 is a front view of the details of the indicator.
Figure 3:
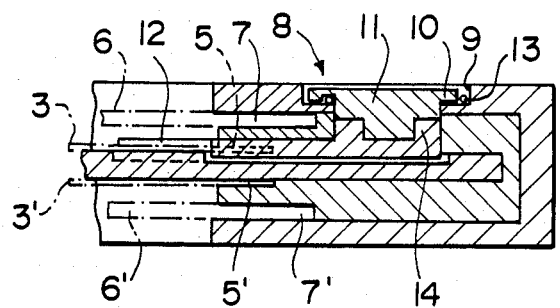
FIG. 3 is a sectional view taken along the line III—III of FIG. 2.
Figure 4:
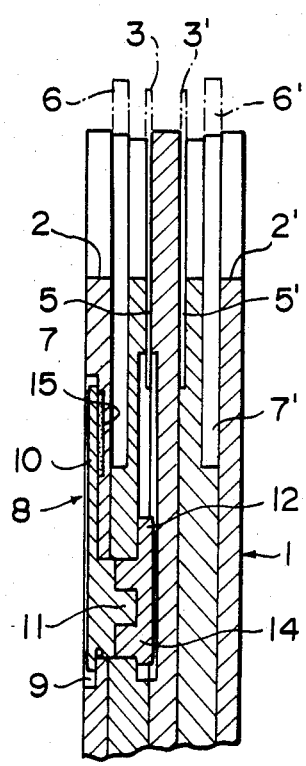
FIG. 4 is a sectional view taken along the line IV—IV of FIG. 2.

Referring now to FIGS. 1 through 4, there is shown a double-sided film holder which includes a substantially frame-shaped body 1. On the opposite sides of the body 1, there are provided exposing windows 2, 2', film receiving channels 5, 5' into which photo sensitive materials, for example, cut films 3, 3' are inserted, with bottom frames 4 being opened, and dark slide receiving slots 7, 7' into which light-sealing dark slides 6, 6' are inserted.

An indicator portion 8 is provided on one surface of the film holder body 1. Specifically, a pivotal indicator element 10 is mounted in a recess 9 for pivotal movement around a pivot 11 mounted at one end thereof. The pivot 11 is faced the film receiving channel 5 and connected with a pivot 14, with a part of the pivot 11 being projected to the film 3 insert portion. The pivot 11 has a spring 13 located therearound, and an actuating element 12 is mounted by the pivot 14. The axis of pivot 11 and the axis of pivot 14 are coaxial. In the double-sided film holder of this embodiment, an indicator portion 8' having the same arrangement as the above arrangement is also mounted on the opposite surface of the body 1.

When the dark slide 6 is removed, and the bottom frame 4 is opened in darkroom to insert a cut film 3 through the film receiving channel 5, one side of the film 3 bears against the actuating element 12. Upon the further insertion of the film 3, the actuating element 12 is moved in the clockwise direction around the pivot 14 in FIG. 2 against the bias of spring 13, and the pivot 14 permits the pivotal indicator element 10 to be pivotally moved likewise in the clockwise direction through the pivot 11. Thus, the position of the pivotal indicator element 10 is changed from the position before the insertion of the film 3, so that the film 3 can be judged to be inserted in the film holder. Moreover, for the purpose of providing a more reliable judgment, a mark 15 may be provided which, for example, is colored red and will appear upon the pivotal movement of the pivotal indicator element 10.

What is claimed is:

1. An indicator for indicating the presence or absence of a photo sensitive material in a film holder comprising
a pivotal indicator element mounted for movement about a pivotal axis,
said pivotal indicator element being mounted on the surface of said film holder near its exposing window,
an actuating element pivotably mounted in said film holder to protrude into a photo sensitive material receiving channel for engagement with any material in said channel,
said actuating element being fixed to said pivotal indicator element and having a pivotal axis, and
said actuating element pivotal axis and said indicator element pivotal axis being coaxial.

2. An indicator as defined in claim 1, wherein biasing means urge said actuating element into said channel.

3. An indicator as defined in claim 1, wherein said indicator element is located in a recess in said film holder.

4. An indicator as defined in claim 1, wherein a mark is provided on said film holder underneath said indicator element in one position of said indicator element.

* * * * *